United States Patent [19]

Williams et al.

[11] 4,115,686

[45] Sep. 19, 1978

[54] CARTRIDGE HEATER WITH IMPROVED THERMOCOUPLE

[75] Inventors: David E. Williams; Edwin D. Hoyt, both of Hemet, Calif.

[73] Assignee: Amark Industries, Inc., San Jacinto, Calif.

[21] Appl. No.: 769,865

[22] Filed: Feb. 18, 1977

Related U.S. Application Data

[63] Continuation-in-part of Ser. No. 668,236, Mar. 3, 1976, Pat. No. 4,010,351.

[51] Int. Cl.² .............................................. H05B 3/80
[52] U.S. Cl. .................................... 219/523; 219/510; 219/544; 219/552; 338/241; 425/144
[58] Field of Search ............... 219/328, 331, 494, 505, 219/510, 523, 544, 552; 338/240, 241; 425/144

[56] References Cited

U.S. PATENT DOCUMENTS

| | | | |
|---|---|---|---|
| 3,754,118 | 8/1973 | Booker | 219/523 |
| 3,890,485 | 6/1975 | Kozbelt | 219/523 |
| 3,911,251 | 10/1975 | Day | 219/523 |
| 3,920,963 | 11/1975 | Beasley | 219/523 |
| 3,970,821 | 7/1976 | Crandell | 219/523 |
| 4,010,351 | 3/1977 | Williams et al. | 219/523 |

*Primary Examiner*—Volodymyr Y. Mayewsky
*Attorney, Agent, or Firm*—Georges A. Maxwell

[57] ABSTRACT

A cartridge heater with improved thermocouple comprising a tubular metal sheath with a front end having a central opening therein, a metal plug engaged in and closing said opening, a filler of dielectric material in the sheath rearward of the plug, a resistance wire within and extending longitudinally of the sheath and supported by said filler, said plug having a pair of circumferentially spaced axially extending and radially outwardly opening grooves, a pair of elongate thermocouple wires supported by the filler within the sheath and having front end portions tightly engaged in and between in said opening and grooves, and an annular weld about the foremost line of contact between said sheath and plug and across the forward ends of said grooves.

11 Claims, 8 Drawing Figures

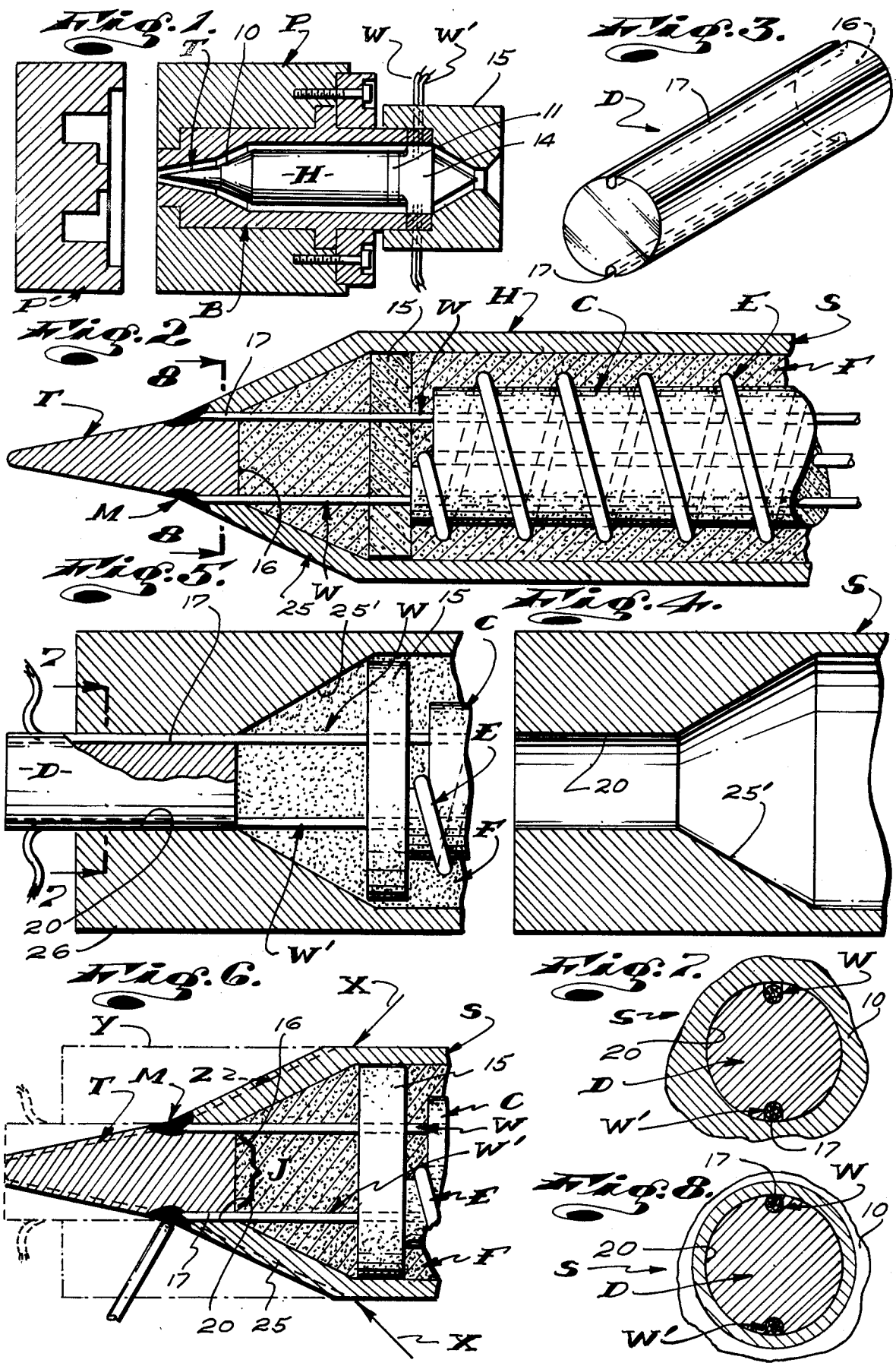

CARTRIDGE HEATER WITH IMPROVED THERMOCOUPLE

This is a continuation-in-part of our copending patent application Ser. No. 668,236, filed Mar. 3, 1976, for CARTRIDGE HEATER WITH IMPROVED THERMOCOUPLE, which application matured into U.S. Pat. No. 4,010,351, on Mar. 1, 1977.

OBJECTS AND FEATURES OF THE INVENTION

This invention has to do with a cartridge type resistance heater and is particularly concerned with a cartridge heater having a novel free end structure embodying and/or establishing a thermocouple junction.

In the heater structure disclosed in our above noted copending application Ser. No. 668,236, the structure of the forward or front end of the heater comprises a plug engaged in and closing the forward end of the tubular metal sheath of the heater. The plug is provided with a pair of axially extending through openings in which tubular insulating sleeves are engaged. The forward ends of a pair of thermocouple wires, extending longitudinally through the sheath, are engaged in said tubes and have forward terminal end portions projecting forwardly from said tubes. The tubes terminate a limited distance inward of the forward ends of the openings in the plug and the said terminal ends of said wires extend forward from the tubes and are fixed with or to the plug, adjacent the forward exterior surface thereof by deposits of metal in the forward ends of said openings and welded with the wires and the plug.

The purpose and end to be attained in the above structure is the establishment of a thermocouple junction at or about a portion of the exterior surface of the heater structure which is rapidly responsive to temperature variations or changes in a fluid medium or the like in which the heater is engaged.

In the above structure the sheath is made tight about the plug by radial inward and axial forward swaging of the construction and the plug is thereafter welded in the sheath as by an annular weld about the forward end of the sheath and plug. The plug is a substantial mass and is such that it can be machined to establish a desired external configuration and so that the forward ends of the thermocouple wires make contact with the mass or metal of the plug in extremely close proximity to the forward exposed surface thereof.

While the above structure is extremely effective and desirable in many instances, the establishment of the through openings in the plug, the provision of insulating tubes, the assembly of the wires, tubes and plug, relative to each other and within the sheath and applied welds, result in a construction which is quite costly to make.

In practice, where the extraordinary fast response afforded by the thermocouple structure or means of the above noted structure is not required and where the thermocouple junction can occur within the heater structure, a slightly greater distance from the exterior surface thereof, we have determined that the insulating tubes provided by our earlier above noted invention can be eliminated and the plug can be made simpler and less expensive by providing the exterior of the plug with grooves in which the thermocouple wires are arranged and held by the heater sheath and fixed and sealed in and with the construction as by swaging and/or welding.

In accordance with the foregoing, it is an object and feature of the present invention to provide a novel cartridge heater structure including an elongate outer metal tubular sheath with an open front end, an elongate metal plug with a flat rearwardly disposed rear end and spaced radially outwardly opening longitudinal grooves, engaged in and closing the front end of the sheath and a structure which includes a pair of thermocouple wires extending longitudinally through the sheath and have front ends engaged in the grooves whereby a thermocouple junction is established within the heater structure across the rear end of the plug between said grooves.

Another object of this invention is to provide a structure of the character referred to above wherein the sheath is swaged longitudinally forwardly and radially inwardly about the plug, whereby the plug is swaged inwardly and the grooves in the plug are caused to close into tight engagement with the thermocouple wires.

Yet another object of our invention is to provide a structure of the general character referred to including a fixing and sealing weld at the forward exterior line of contact between the sheath and the plug and which closes the forward ends of the grooves in the plug and fixes the forward terminal ends of said wires with said plug and sheath.

Still further, it is an object of our invention to provide a structure of the character referred to above wherein the sheath has a primary cylindrical bore entering its rear end and a secondary cylindrical bore or plug-receiving opening of reduced diameter and of limited longitudinal extent entering its front end and communicating with the primary bore, whereby a plug of reduced diameter is provided to close the open front end of the sheath and whereby a thermocouple junction across the rear or inner end of the plug and of limited predetermined lineal extent is provided.

It is an object of our invention to provide an elongate tubular metal sheath having a cylindrical tubular rear end portion and a cylindrical front end portion with a central through opening to receive an elongate cylindrical plug with radially outwardly opening longitudinally extending thermocouple wire receiving grooves, said front end portion of the sheath and said plug assembly being machined and/or dressed to establish and provide the front end portion of the heater structure with a predetermined special configuration, the major dimensions of which occur within the major outside dimensions of the sheath and the longitudinal extent of said forward portion of the sheath and said plug.

The foregoing and other objects and features of our invention will be fully understood from the following detailed description of one typical preferred form and embodiment of the invention, throughout which description reference is made to the accompanying drawings, in which:

FIG. 1 is a sectional view of a mold structure with a feed bushing and having a cartridge type heater embodying our invention related thereto;

FIG. 2 is an enlarged detailed sectional view of a portion of the heater shown in FIG. 1;

FIG. 3 is an isometric view of a grooved plug provided by this invention;

FIG. 4 is a sectional view of the front end portion of a sheath provided in accordance with this invention;

FIG. 5 is a sectional view showing parts of our construction in an assembled relationship, during the course of manufacturing our invention;

FIG. 6 is a view similar to FIG. 5 showing the construction in another stage of manufacture;

FIG. 7 is a view taken substantially as indicated by line 7—7 on FIG. 5; and

FIG. 8 is a view taken substantially as indicated by line 8—8 on FIG. 2.

The heater H that we provide and which is shown in the drawings is an elongate cylindrical unit with front and rear ends or front and rear end portions 10 and 11.

In FIG. 1 of the drawings, the heater is shown as a torpedo or sprue heater supported centrally in and extending longitudinally through a sprue opening in a feed bushing B in a mold plate P of a set of mold plates P and P', provided for the injection molding of plastic parts. The front end portion of the heater H defines or is provided with a tapered or pointed tip T, which tip is shaped complimentarily with the inner end portion of the sprue opening or passage in the bushing B. The outer or rear end portion 11 of the heater H is suitably fixed to the front end of a longitudinally outwardly convergent central island 14 of a spider within an injector engaging adapter cap 15, engaged on and carried by the outer free end of the bushing B.

The heater H serves to maintain the heated plastic which is conducted through the bushing, hot, and serves to replenish that heat which is lost or conducted from the plastic into the bushing and the plate P. The heating operation afforded by the heater H is to assure that the plastic flowing through the structure and into the cavity or cavities defined by the mold plates P and P' will flow properly through the construction. The heater, in addition to heating the structure and material flowing therethrough, as noted above, can also serve as a needle-type valving member to cooperate with the opening in the bushing B to meter or control the rate of flow of plastic through and from said bushing.

The foregoing environment in which our heater structure H is shown is only one special use to which our structure can be advantageously put and is included as an example of one use.

The basic structure of the heater H rearward of their front end portion thereof, is substantially conventional and involves no novel subject matter. Accordingly, we will restrict this disclosure to the forward end portion of the heater H and will describe only that portion of the remainder of the heater which is directly related to the front end portion thereof.

The structure of the heater H directly rearward of the front end portion comprises an elongate, frangible, longitudinally extending, cylindrical central core C of compacted and centered magnesium oxide or the like. An elongate resistance wire or heating element E is helically wound about the core C. The forward end of the element is turned radially inwardly at the front end of the core and is turned rearwardly to extend through a central opening in the core. The core is arranged centrally in and extends longitudinally through the outer metal sheath S with the element E in spaced relationship from said sheath.

The annulus between the sheath and the core C is filled with a suitable insulating filler F such as magnesium oxide. The filler F is compacted in the annulus and about the element E and the core C by radial inward and axial forward swaging of the construction during the manufacture of said construction. Upon swaging and compacting of the filler F, the core C is reduced by the applied pressures and in such a manner that the core and filler become what is in essence a unitary compacted mass of granular, dielectric, oxide.

In addition to the foregoing and in accordance with old practice, the core C is provided with a pair of longitudinally extending openings through which a pair of thermocouple leads or wires W and W' are engaged. The openings for the wires W and W' are preferably located at diametrically opposite sides of the central opening in the core and are spaced substantially midway between the central opening in the core and the exterior of said core, whereby the wires W and W' are maintained in spaced relationship from each other and from the element E throughout the longitudinal extent of the assembly.

In accordance with common practice, a washer-like spacer 15 of suitable dielectric material and provided with openings to accommodate the wires W and W' is arranged within the sheath S adjacent the front end of the core C. The washer 15, like the core C, is established of compacted oxide and is such that when the construction is swaged, the washer is reduced and combines with the filler F.

In practice, the rear end of the sheath is closed and sealed by a rear plug (not shown) of suitable insulating material, such as lava. The rear plug is provided with spaced axially extending through openings through which the lead ends of the wires W and W' and the lead ends of the element E extend. The lead ends of the element E (not shown) extend to and connect with suitable power supply means for the heater and the lead ends of the wires W and W' extend to and connect with suitable control means for said power supply means (not shown).

As illustrated in FIG. 1 of the drawings, the several leads can extend through legs of the spider which supports the heater in the bushing adapter 15 and extend through and laterally from the sides of said adapter.

In its most basic aspects, the front portion of the heater H, wherein our invention resides, includes the forward end portion of the sheath S and an elongate cylindrical central metallic plug D engaged in and closing the front end of the sheath. The plug D has a flat, radially extending, axially rearwardly disposed rear end surface and has a pair of elongate, longitudinally extending, circumferentially spaced, radially outwardly opening grooves 17 in which the forward free end portions of the wires W and W' are engaged, to extend longitudinally therethrough and which are held therein by the adjacent portions of the sleeve. The line of joinder between the sheath and the plug, at the forward external surface of the assembly, is sealed by a weld M, which weld extends across and seals the open front ends of the passages defined by the grooves and the sheath and which fixes the adjacent ends of the wires W and W' to the sheath and the plug. The line between the rear open ends of the grooves 17 (where the wires W and W' first contact the plug) across the rear surface 16 of the plug establishes a thermocouple junction J, which junction is responsive to changes in temperature of the portion of the plug, across which said junction extends.

In the particular form of the invention illustrated, the plug D is an elongate cylindrical unit and has a rear end portion engaged in and extending longitudinally through a limited predetermined portion of the sheath, at the forward end thereof. The plug terminates in the sheath with its rear end 16 in forward spaced relationship from the core C and the element E related thereto and forward of the intermediate washer 15, if such a washer is provided or included. The space between the plug and other parts within the sheath, rearward of the plug, is occupied by the filler F.

In practice, and as shown, the forward open end of the sheath in which the plug is engaged can be reduced or be of less diametric extent than the remainder of the sheath which occurs rearwardly of the plug and the plug can be reduced in diametric extent, accordingly. By so reducing the diametric extent of the plug, the length of the junction J, across the rear end 14 of the plug, can be shortened and adjusted, as desired, or as circumstances require.

In practice, it is possible to reduce the diameter of the front end of the sheath in which the plug occurs by preforming that portion of the sheath so that it tapers radially inwardly and forwardly, as clearly shown at 25 in FIG. 2 of the drawings. After forming the sheath as noted above, the central opening 20 defined thereby is machined or dressed to cooperatively receive and engage the plug.

The forward portion of the plug D projecting forward from the sheath S can also be suitably formed in some predetermined manner, prior to assembly of construction. For example, the noted forward end portion of the plug can be made to taper radially inwardly and forwardly and to establish a substantially pointed tip T.

While the above practice of establishing our structure is possible, it is not wholly compatible with the most common methods and procedures employed in the manufacture of cartridge type heaters and is therefore considered less than the most desirable practice or manufacturing procedure. The principal shortcoming of the above procedure exists in the inability of such preformed structure to be effectively swaged, to effect compaction of the filler, core and washer within the sheath.

In the preferred carrying out of our invention and as shown in FIGS. 4 through 8 of the drawings, the sheath S is of uniform outside diameter throughout its longitudinal extent. The wall thickness of the front end portion 26 of the sheath, in which the plug D is to be arranged, is increased or thicker than the wall thickness of the remainder of the sheath, rearward of said front end portion, whereby the forward open end or plug receiving openint 20 in the sheath is of predetermined diameter and such that it cooperates with the diameter of the plug D related thereto to establish a snug fit therewith, as clearly shown in FIGS. 4 and 5 of the drawings.

In the preferred carrying out of the invention, the wall thickness of the portion 25' of the sheath, immediately rearward of the forward portion thereof, is gradually increased from rear to front so that the sheath has what can be called or termed an intermeaite portion, the inside surface or bore 26 of which is radially inwardly and forwardly tapered to extend axially and radially between the major and minor inside diameters of the sheath. Such tapering of the intermediate portion of the sheath facilitates effective swaging of the construction and also enables machining of the construction to establish a tapered forward end portion 25 on the sheath, having uniform wall thickness, as will hereinafter be described.

The forward end portion 26 of the sheath, with increased wall thickness and defining the opening 20, is substantially greater in longitudinal extent than the front end portion 25 of the sheath when the construction here provided is completed.

With the sheath S thus established, the core C, element E, wires W and W' and the spacer 15 are arranged in the cartridge S from the open rear end thereof and the forward ends of the wire W and W' are engaged through the opening 20.

The plug D is then arranged forward of the opening 20 and the forward end portions of the wires W and W' are slidably engaged in the grooves 17 thereof. Upon engagement of the wires in the grooves, the core is slidably advanced rearwardly relative to the wires and into snug engagement in the opening 20 of the sheath S, as shown in FIG. 5 of the drawings.

Thereafter, the filler F is deposited in the sheath and the rear end of the sheath is closed by suitable plug means through which leads for the element E and for the wires W and W' freely extend.

Next, the assembly is swaged axially forwardly and radially inwardly as indicated by the arrows X in FIG. 6 of the drawings to reduce the outside diameter of the sheath and to compact the filler F therein. Upon swaging the structure, as above noted, the sheath is urged tight about the plug and the mass of the plug is caused to flow and close the grooves thereof about the wires W and W', as shown in FIG. 8 of the drawings.

Following swaging of the construction, the forward portion 26 of the sheath is machined away and the central portion 25' of the sheath is machined away as indicated by dotted lines Y in FIG. 6 of the drawings so that the exterior surface of that portion of the sheath is parallel with the inside surface $25^2$ thereof and the sheath is left or provided with an axially forwardly and radially inwardly tapered front end portion 25 which fares into and joins the rear end portion of the plug D, as clearly illustrated in FIGS. 2 and 6 of the drawings.

As the sheath is machined, the forward end portion of the plug D is machined to establish the tip T, as indicated by dotted line Z in FIG. 6 of the drawings.

After the above noted rough machining operation or operations are completed, the forward exposed or outside line of joinder between the plug and sheath and the adjacent stock of said plug and sheath are welded, as at M. The weld M extends across the forward open ends of the grooves 17 and across the forward ends of the wires W and W' to seal the construction and to fix the several parts together.

After the noted welding operation is completed, the rough machined, specially formed front end portion of the assembly is preferably subjected to a finishing and-/or dressing machining operation, as indicated by dotted lines in FIG. 6 of the drawings to clean the exterior of the weld M, establish the said front end portion of the heater with predetermined dimensions, and to provide the construction with a finished surface.

It will be apparent that with the plug and sheath structure here provided, the configuration of the front end of the heater can be made in substantially any desired form or configuration, within practical limits and that the distance between the wires W and W', at the rear end of the plug, which establishes the thermocouple junction J, can be increased or decreased to a substantial extent by increasing and decreasing the diameter of the plug and of the opening 20 in the front end of the sheath.

In practice, the plug D can be established of a metal which is dissimilar to the metal from which the sheath S is established, whereby the heat conductivity and/or electrical conductivity of the plug D and of the junction J established thereby can be made to meet a wide range of special requirements relating to the thermo response of the thermocoupling means herein provided.

Having described only one typical preferred form and application of our invention, we do not wish to be limited to the specific details herein set forth, but wish to reserve to ourselves any modifications and/or variations that may appear to those skilled in the art and which fall within the scope of the following claims:

Having described our invention, we claim:

1. A cartridge heater with improved thermocouple comprising an elongate tubular, cylindrical metal sheath with open front and rear ends, an elongate electric and heat conducting metal plug with a rearwardly disposed rear end in tight heat conducting contact within and closing the front end of the sheath, a filler of dielectric material in the sheath rearward of the plug and an elongate resistance wire element supported by said filler, said plug having a pair of circumferentially spaced, elongate, radially outwardly opening longitudinal grooves cooperating with the sheath to define radially spaced longitudinal passages opening at the front of the sheath and at the rear end of the plug, a pair of elongate thermocouple wires extending longitudinal in the sheath and supported by said filler, said wires having front end portions in tight heat and electric conducting engagement in the passages and electrically contacting said plug at said rear end thereof, whereby said rear end of the plug establishes a thermocouple junction between the wires, weld means sealing between the plug and sheath, and sealing said passages, conductors for said wires and elements extending freely from the rear end of the sheath and means sealing said rear end of the sheath and about said conductors.

2. The structure set forth in claim 1 wherein said weld means sealing between the plug and sheath and sealing the forward end of said passages includes an annular weld at the line of contact between the plug and sheath at the front end of the structure and across the open forward ends of said passages.

3. The structure set forth in claim 2 wherein said sheath is swaged radially inwardly into tight engagement about the plug and into tight engagement with the wires in said grooves and wherein said plug is swaged to form said grooves into tight engagement with said wires.

4. The structure set forth in claim 3 wherein the forward portion of the sheath engaged with the plug is less in diametric extend than the remainder of the sheath and said plug corresponds in outside diameter with the inside diameter of said forward portion of the sheath.

5. The structure set forth in claim 4 wherein the plug has a forward portion projecting freely from said forward portion of the sheath.

6. The structure set forth in claim 1 wherein said plug is less in diametric extent than the inside diameter of the portion of the sheath about said element and wherein the portion of the sheath forward of the element tapers radially inwardly and forwardly and joins the plug.

7. The structure set forth in claim 6 wherein the plug has a forwardly and radially inwardly convergent front end portion projecting freely forwardly from the forward terminal end of the sheath.

8. The structure set forth in claim 6 wherein said weld means sealing between the plug and sheath and sealing the forward end of said passages includes an annular weld at the line of contact between the plug and sheath at the front end of the structure across the open forward ends of said passages and the forward ends of said front end portions of the thermocouple wires.

9. The structure set forth in claim 8 wherein said sheath is swaged radially inwardly into tight engagement about the plug and into tight engagement with the wires in said grooves and wherein said plug is swaged to form said grooves into tight engagement with said wires.

10. The structure set forth in claim 6 wherein said sheath is swaged radially inwardly into tight engagement about the plug and into tight engagement with the wires in said grooves and wherein said plug is swaged to form said grooves into tight engagement with said wires.

11. The structure set forth in claim 1 wherein the plug is established of a metal having predetermined characteristics of heat and electric conductivity and is dissimilar from the metal establishing the sheath.

* * * * *